(12) United States Patent
Mangels et al.

(10) Patent No.: US 11,473,639 B2
(45) Date of Patent: Oct. 18, 2022

(54) COINED DRAWBARS FOR DRAWBAR ASSEMBLIES

(71) Applicant: LEE SPRING COMPANY LLC, Brooklyn, NY (US)

(72) Inventors: Albert G. Mangels, Rockaway Park, NY (US); Billy Burier, New York, NY (US); Valentin Fridmanovich, Forest Hills, NY (US); Christopher Wisniewski, Staten Island, NY (US); Stephen R. Kempf, Brooklyn, NY (US)

(73) Assignee: LEE SPRING COMPANY LLC, Brooklyn, NY (US)

( * ) Notice: Subject to any disclaimer, the term of this patent is extended or adjusted under 35 U.S.C. 154(b) by 0 days.

(21) Appl. No.: 17/272,561

(22) PCT Filed: Sep. 4, 2019

(86) PCT No.: PCT/US2019/049567
§ 371 (c)(1),
(2) Date: Mar. 1, 2021

(87) PCT Pub. No.: WO2020/051224
PCT Pub. Date: Mar. 12, 2020

(65) Prior Publication Data
US 2021/0324931 A1    Oct. 21, 2021

Related U.S. Application Data

(60) Provisional application No. 62/726,688, filed on Sep. 4, 2018.

(51) Int. Cl.
*F16F 1/12*    (2006.01)
*E04H 4/10*    (2006.01)

(52) U.S. Cl.
CPC ............... *F16F 1/128* (2013.01); *E04H 4/10* (2013.01)

(58) Field of Classification Search
CPC ................................ F16F 1/128; F16F 1/12
(Continued)

(56) References Cited

U.S. PATENT DOCUMENTS 1,462,932 A * 7/1923 John ..................... B61H 13/34
                                                   267/72
1,489,321 A * 4/1924 Henderson ............. B60D 1/182
                                                    267/72
(Continued)

FOREIGN PATENT DOCUMENTS

WO     WO 00/74612    12/2000

*Primary Examiner* — Thomas W Irvin
(74) *Attorney, Agent, or Firm* — Cozen O'Connor (57) ABSTRACT

A drawbar assembly having a first continuous drawbar having an open end, a closed end, and an elongate body extending therebetween along an axis, and a spring anchor formed at the open end; a second continuous drawbar having an open end, a closed end, and an elongate body extending therebetween along the axis, and a spring anchor formed at the open end; the first and second drawbars oriented with respect to each other such that at least a portion of each elongate body overlaps with the other along the axis and the open end of one drawbar is proximate the closed end of the other; and a compression coil spring positioned over the overlapping elongate body portions and secured at each end by a respective spring anchor; wherein a region of at least one closed end is coined.

9 Claims, 15 Drawing Sheets

(58) Field of Classification Search
USPC .......................................................... 267/72
See application file for complete search history.

(56) References Cited

U.S. PATENT DOCUMENTS

| | | | |
|---|---|---|---|
| 1,523,826 A | | 1/1925 | Munro |
| 1,583,806 A | * | 5/1926 | Snyder .................... B60D 1/155 |
| | | | 267/72 |
| 1,648,104 A | * | 11/1927 | Bean ........................ B60C 27/08 |
| | | | 152/219 |
| 2,022,106 A | * | 11/1935 | Cole ........................ F16F 1/128 |
| | | | 267/72 |
| 2,334,936 A | * | 11/1943 | Kurzawa ................... B60B 9/06 |
| | | | 267/72 |
| 2,461,633 A | * | 2/1949 | Dorey ..................... B61H 13/34 |
| | | | 267/72 |
| 2,933,311 A | * | 4/1960 | Spak ...................... B60P 7/0823 |
| | | | 267/72 |
| 3,653,652 A | | 4/1972 | Lindberg |
| 5,232,207 A | | 8/1993 | Champ et al. |
| 6,260,833 B1 | * | 7/2001 | Drager ...................... F16F 1/12 |
| | | | 267/179 |
| 6,419,211 B1 | * | 7/2002 | Hvittfeldt ............ B25J 17/0275 |
| | | | 267/74 |
| 8,490,987 B2 | * | 7/2013 | Narishima ........... B60G 21/055 |
| | | | 280/124.107 |
| 8,740,196 B2 | * | 6/2014 | Elrod ........................ B60D 1/50 |
| | | | 267/74 |
| 10,473,175 B1 | * | 11/2019 | Wild ........................ F16F 1/128 |

\* cited by examiner

Prior Art

FIG 10B

Prior Art

COINED DRAWBARS FOR DRAWBAR ASSEMBLIES

CROSS REFERENCE TO RELATED PATENT APPLICATION

This is a U.S. national stage of application No. PCT/US2019/049567, filed on Sep. 4, 2019. This application claims benefit to U.S. Provisional application 62/726,688, filed Sep. 4, 2018

BACKGROUND OF THE INVENTION

1. Field of Invention

The invention relates to springs and related products, more particularly to drawbar spring assemblies.

2. Related Art

Figure 1A:
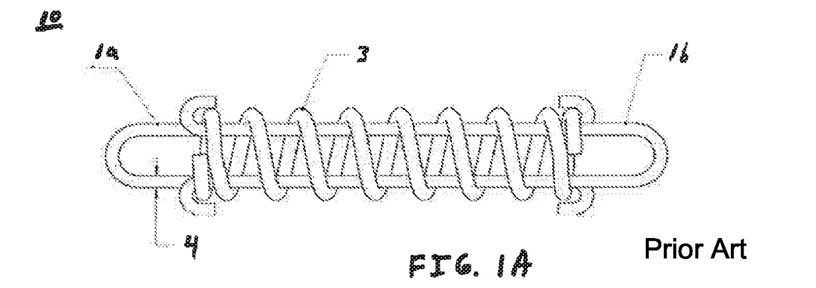
FIGS. 1A and 1B are views showing a conventional drawbar assembly of the prior art.
Figure 1B:
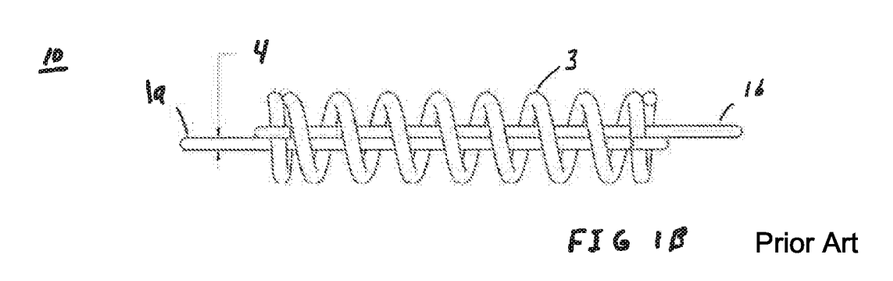

An example of a conventional drawbar spring assembly 10 is shown in FIGS. 1A and 1B.

Drawbar spring assemblies comprise multiple wire bars or "drawbars" 1a and 1b which are passed through a helical compression spring 3. When a load is applied to the assembly 10, the drawbars 1a and 1b extend away from each other along a longitudinal axis causing the spring 3 to compress. This gives the assembly 10 the property of an extension spring with the added benefit of a fixed stop (at compression of the spring 3 to "solid", i.e., all coils of the spring touching) to prevent overstretching. When compared to prior extension springs, drawbar spring assemblies can withstand much greater loads without being damaged.

FIGS. 1A and 1B show top and side views, respectively, of a conventional drawbar spring assembly 10 in a free state, i.e., unattached to any external members. The drawbar assembly 10 includes a first drawbar 1a, a second drawbar 1b and a compression spring 3.

Figure 2A:
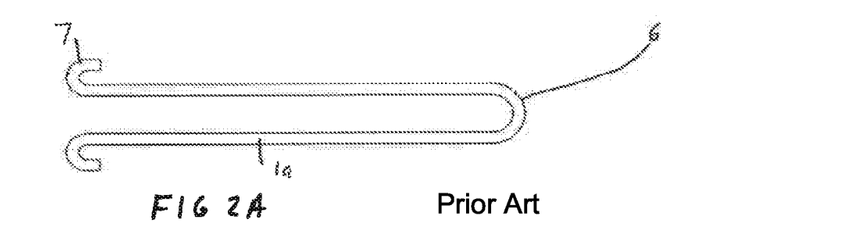
FIGS. 2A and 2B are views showing a conventional drawbar of the prior art.
Figure 2B:
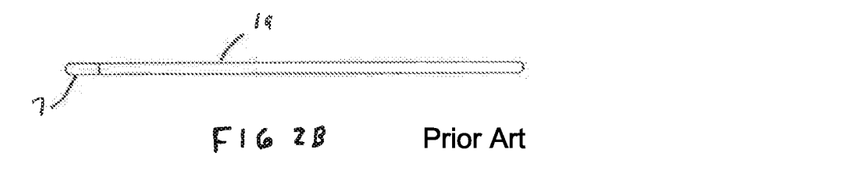

As shown in FIGS. 2A and 2B, each drawbar 1a and 1b has a closed end, typically configured as a "U" shaped securement end 6 opposite an open end configured as "hooks" 7, with an elongate body extending between the closed and open ends 7. To provide for symmetric load bearing, as well as for aesthetic purposes, both drawbars 1a and 1b are generally made of the same gauge wire.

Figure 3A:
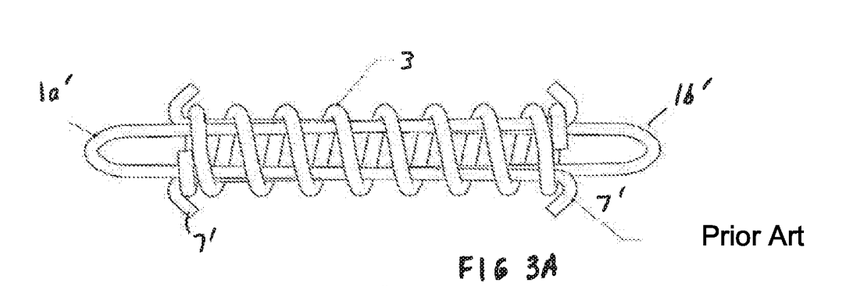
FIGS. 3A and 3B are views showing a conventional drawbar assembly in a distorted state.
Figure 3B:
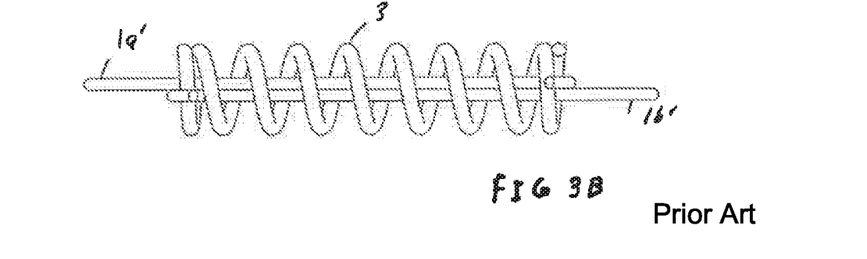

A problem with conventional drawbar assemblies is that if a load is applied to the drawbar assembly that exceeds the load required to fully compress the spring 3, the assembly 10 will demonstrate additional deflection as the applied load is further increased. As the applied load increases even further, at some point the drawbars 1a and/or 1b will start to permanently deform or distort either by an elongation of the U-shaped securement end and/or by an unwinding of the hook ends 7. This condition is shown in FIGS. 3A and 3B, which shows distorted drawbars 1a' and 1b', as well as unwinding hooks 7'.

A similar deformation occurs in drawbar assemblies that are used for swimming pool covers, which is a very common usage for such assemblies. The conventional use of such assemblies in securing pool covers is discussed below.

Figure 4:
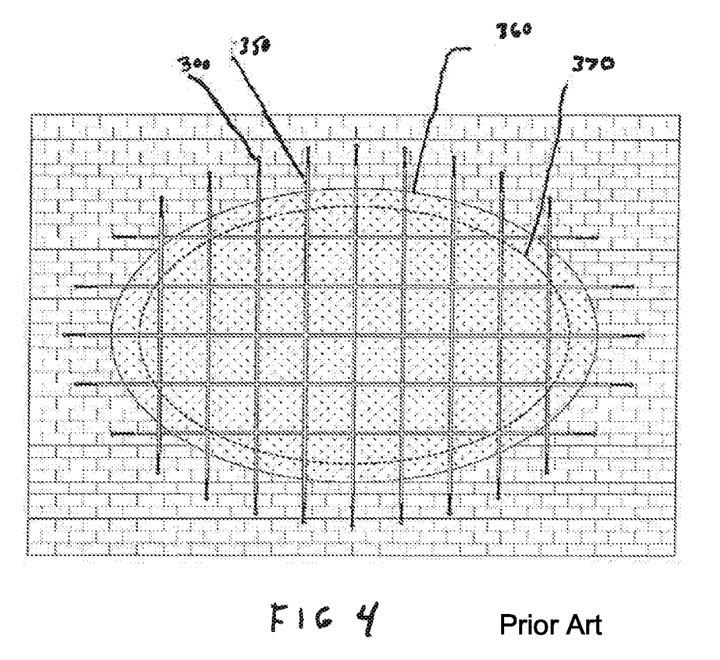
FIG. 4 illustrates how drawbar assemblies are used to secure a pool cover.

As shown in FIG. 4, in securing pool covers a plurality of drawbar assemblies 300 are mounted between straps 350 of a pool cover 360 and fixed mounting anchors 380 (see FIG. 6) arranged at points around an edge 370 of the pool in a cement or wood decking. The closed end of a first drawbar, which is circular shaped, holds the fixed mounting anchor 380, and the closed of the other drawbar is squared-shaped and holds extended straps of the pool cover. The drawbar springs provide flexibility to the safety-cover under various loads such as snow, tree branches and debris, or someone walking on it, while constantly maintaining tension on the straps and the anchors.

Figure 5A:
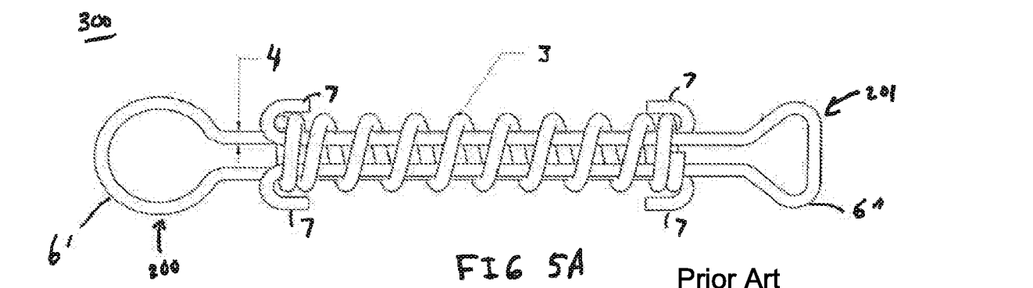
FIGS. 5A and 5B are views showing a conventional pool cover drawbar assembly.
Figure 5B:
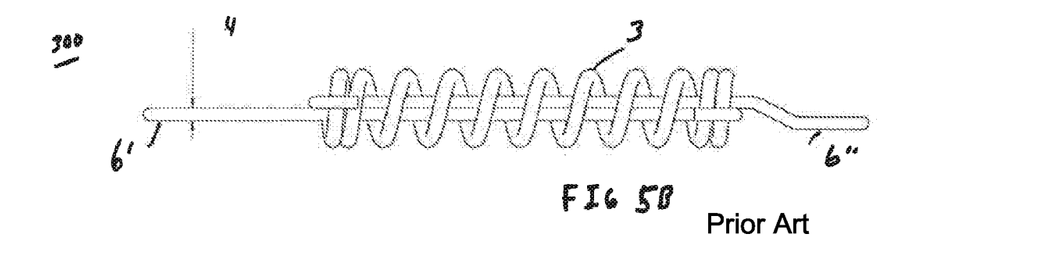
Figure 6:
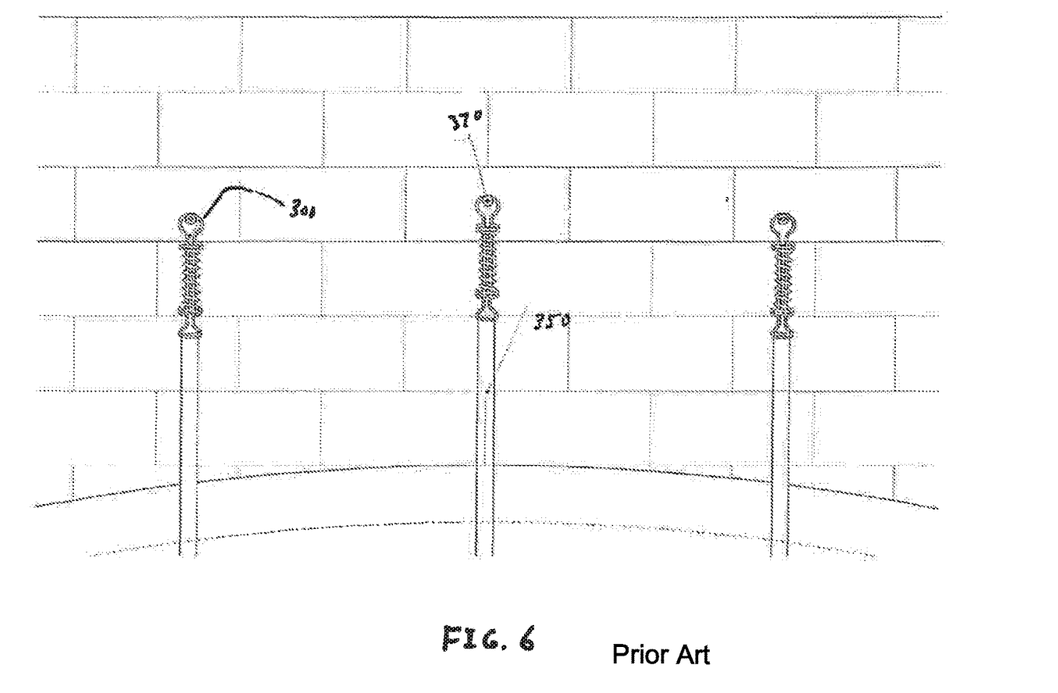
FIG. 6 shows a pool cover with installed pool cover drawbar assemblies.

As shown in FIGS. 5A and 5B, a typical configuration for a drawbar assembly 300 for a pool cover includes a drawbar 200 with a closed round securement end 6', and another drawbar 201 with a closed square securement end 6". The round-ended drawbar 200 is mounted over the fixed anchoring stud 380. The square-ended drawbar 201 holds the straps 350 which allow for tension adjustment of the pool cover. The compression spring 3 and the hook ends 7 perform the same function mentioned above for these elements. A detailed view of the securement is shown in FIG. 6.

The width of the square securement end 6" is large enough to accommodate the width of the straps necessary to withstand the applied loads and attach to the pool cover.

Figure 7:
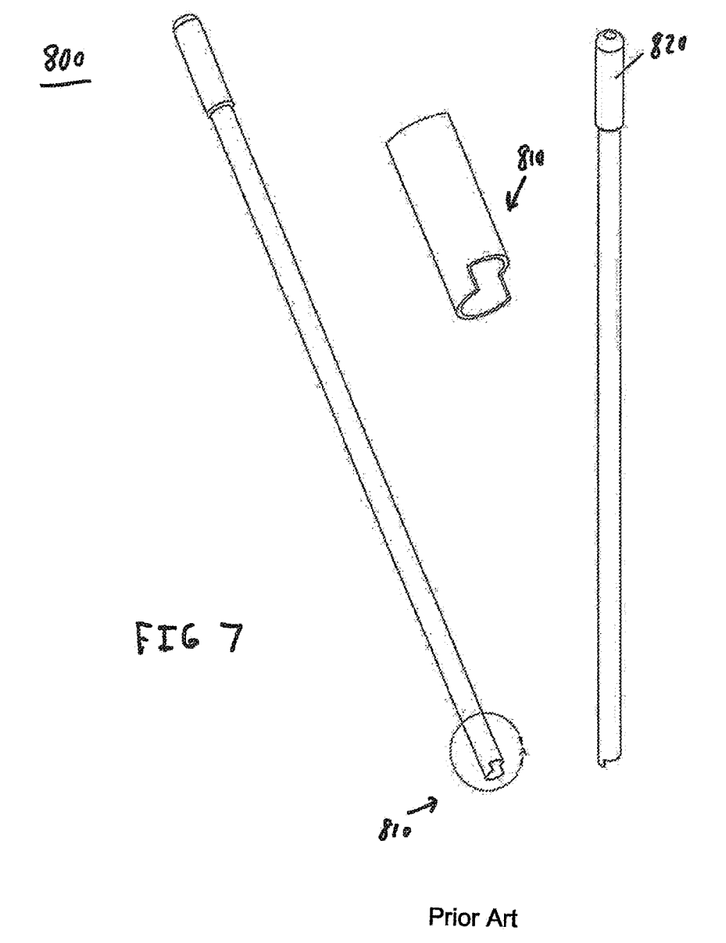
FIGS. 7 and 8 illustrate an installation tool for installing a pool cover drawbar assembly in securing a pool cover.
Figure 8:
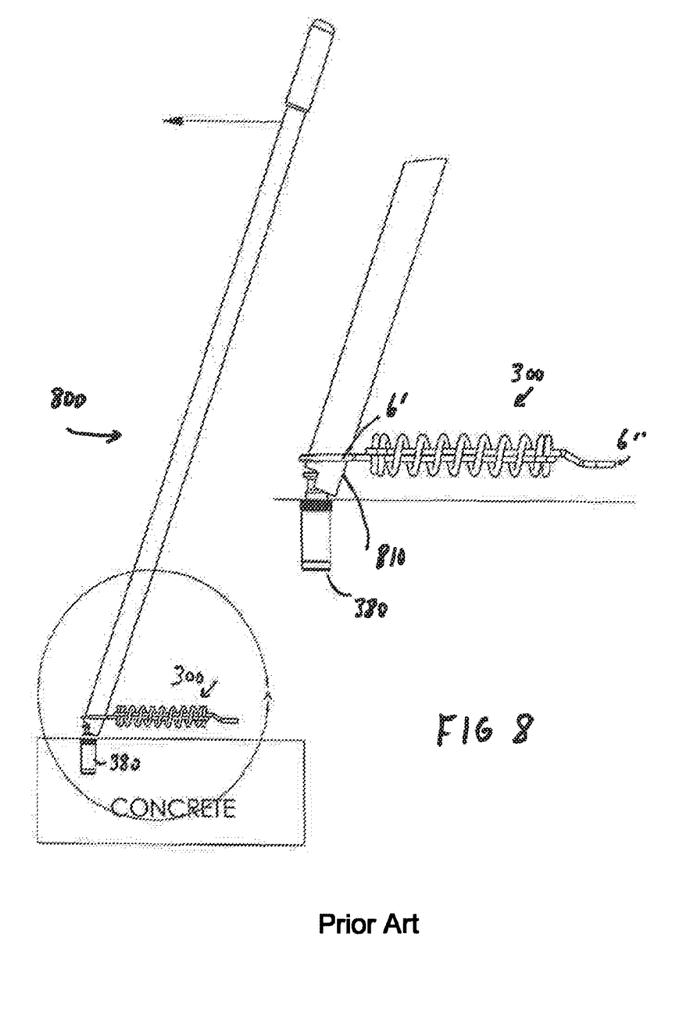

The diameter of the round securement end 6" of round-ended drawbar 200 is large enough to allow for an assembly tool 800 to be inserted to assist the user in stretching the drawbar assembly and sliding it over the anchor 380. As shown in FIGS. 7 and 8, the assembly tool 800 has and engagement end 810 and a user handle 820. The engagement end 810 is shaped so as to permit it to engage with the anchor stud 380 and, by applying a rocking motion to the handle 820, the round securement end 6" of round-ended drawbar 200 is guided to engage the anchor stud 380.

Figure 9A:
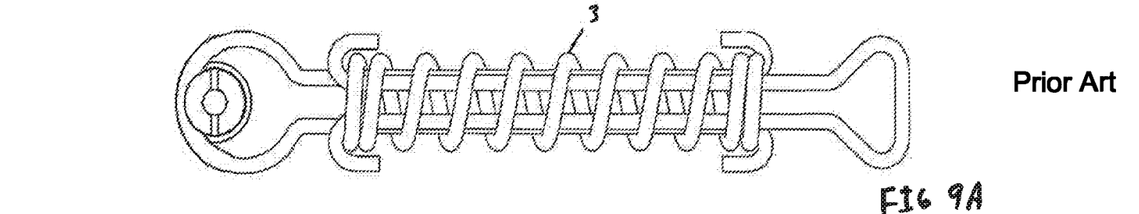
FIGS. 9A and 9B are views showing a conventional pool cover drawbar assembly engaged over a mounting anchor.
Figure 9B:
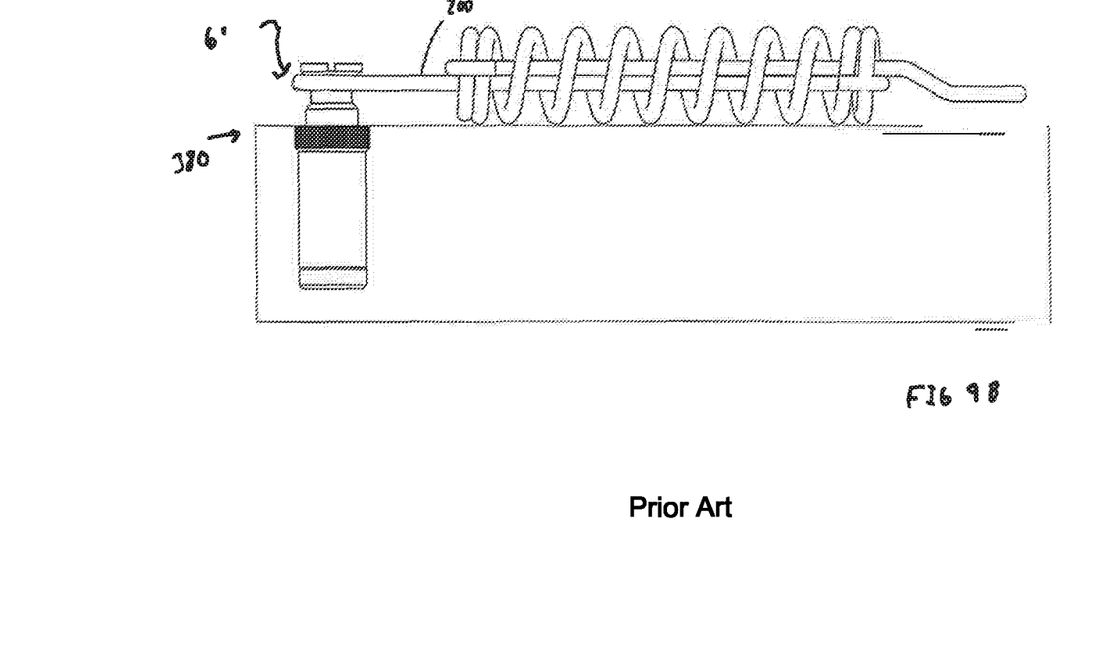

Once secured, the engagement is as shown in FIGS. 9A and 9B.

While the strap more or less distributes the applied load evenly across the square-ended drawbar, the mounting anchor, which has a smaller diameter than the round-ended drawbar, creates a point load. This point load can cause the round-ended drawbar to deform (e.g., elongate, etc.) when overloaded, to an extent such that the installation tool can no longer be used because it would no longer fit.

Figure 10A:
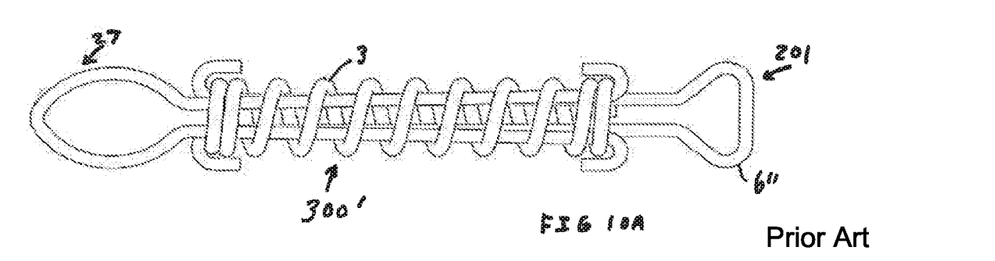
FIGS. 10A and 10B are views showing a conventional pool cover drawbar assembly in a distorted state.
Figure 10B:
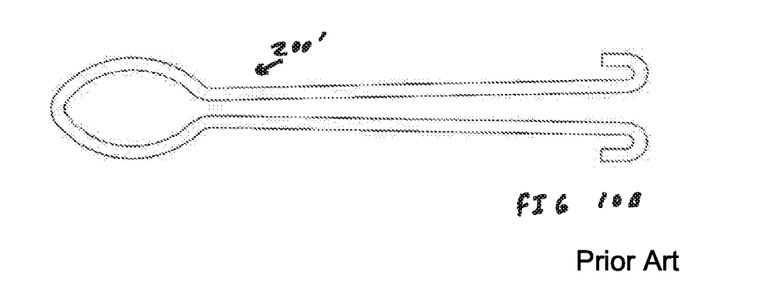

An elongated round-ended drawbar 200', with a distorted round end 27, is shown in FIGS. 10A and 10B.

One way of preventing these failures, is to strengthen the drawbars. The most straightforward way to strengthen the drawbars is to increase the wire gauge from which they are formed. However, this solution increases the volume of material used with a corresponding increase in material cost. Additionally, forming the drawbars using larger dimensions results in a more-difficult manufacturing process, for example requiring larger machinery.

Although changing the material of the drawbars to a stronger alloy could also help resolve the issue, in some applications, for example when stainless steel has been selected because of its corrosion resistant properties, such stronger alloys may not be readily available.

In view of the foregoing, there is a need for an improved drawbar assembly that provides additional protection against deforming under heavy loads, while also not adding to an increase in materials used in their formation.

SUMMARY OF THE INVENTION

In accordance with one aspect of the invention, an improved drawbar assembly is disclosed. The assembly has a first continuous drawbar having an open end, a closed end, and an elongate body extending therebetween along an axis, and a spring anchor formed at the open end. The assembly further has a second continuous drawbar having an open end, a closed end, and an elongate body extending therebetween along the axis, and a spring anchor formed at the open end. The first and second drawbars are oriented with respect to each other such that at least a portion of each elongate body overlaps with the other along the axis and the open end of one drawbar is proximate the closed end of the other. A compression coil spring is positioned over the overlapping elongate body portions and is secured at each end by a respective spring anchor, wherein a region of at least one closed end is coined.

The improved drawbar assembly is particularly useful in connection with securing swimming pool covers over a swimming pool when the pool is not in use, such as in the off-season. For such use, a closed end of one of the drawbars is circular-shaped and dimensioned to secure to a pool cover anchor post of the type typically secured to a pool deck or patio. Coining is provided to the portion of the circular shape that contacts the anchor post. The closed end of the other drawbar is in a non-circular shape, such as a squared off shape to provide attachment to a pool cover strap. The spring anchors can also be coined to provide additional strength against unwanted distortion or deformation of the drawbars.

DETAILED DESCRIPTION OF THE EMBODIMENTS

Figure 11A:
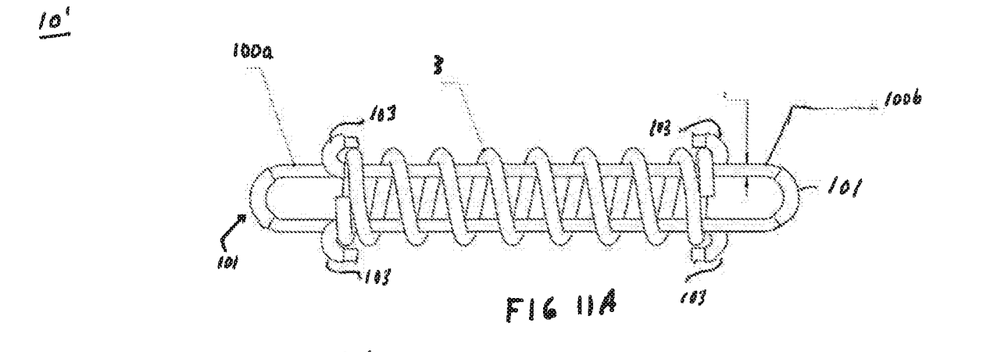
FIGS. 11A and 11B are views showing a coined drawbar assembly in accordance with an embodiment of the invention.
Figure 11B:
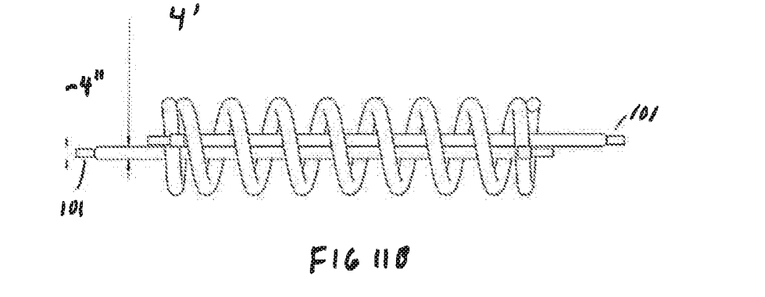

In accordance with one aspect of the present invention, namely a general use drawbar assembly for example as can be seen in FIGS. 11A and 11B, a coined drawbar assembly 10' is provided. In this embodiment, the drawbars 100a and 100b each have an open end, a closed end and a continuous body extending therebetween. The closed ends form a U-shape 101 and are coined at that region (in part or in full), providing an increase in strengthening. Thus, the entire drawbar is made of a continuous wire material of constant thickens or diameter 4', except at the coining region where the diameter is flattened or decreased as 4". Preferably, this coining is limited to the region in which such strengthening is needed i.e., an area of the U-shaped end. Thus, for example, coining at the closed ends makes the assembly 10' more resistant to distortion such as was discussed in relation to FIGS. 3A and 3B above.

Coining is a form of precision stamping in which a workpiece is subjected to a sufficiently high stress to induce material flow on the surface of the material, which produces a flattened portion of the drawbar. The term comes from the initial use of the process: the manufacturing of coins.

The open ends of the drawbars terminate into curved hooked regions 103 which may also be coined. Such coining 103 makes the hooks more resistant to distortion of the type discussed above in relation to FIGS. 3A and 3B above.

Figure 12A:
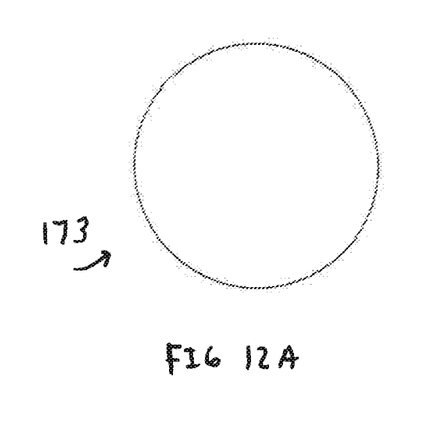
FIGS. 12A and 12B are views showing a round section adjacent a coined section of wire and a flattened section of the wire in the coined section.
Figure 12B:
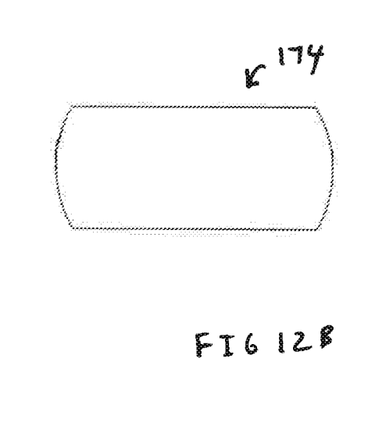

FIG. 12A illustrates a round section 173 of the wire of the drawbar before coining and FIG. 12B shows a flattened section 174 of the wire of the coined section of the drawbar after the coining.

This flattening of the material of the drawbars changes the cross-sectional dimension or "section modulus" in the coined region, making the drawbars more resistant to bending (distortion) in the direction of the loading. Section Modulus is a geometric property for a given cross-section used in the design of beams or flexural members.

Coining of the drawbar wire in a drawbar assembly 10' on one or both ends yields the following benefits:

The coined drawbar end of FIGS. 11A and 11B, when acting as a securement end, will maintain its fit with a mating part to which it attaches, as the coined securement end is less likely to distort and lose diameter under heavy loads due to the stronger cross rectangular section of FIG. 12B (versus the conventional round cross section of FIG. 12A). This strength comes as:

- The result of a better distribution of the same amount of material relative to neutral bending axis.
- The result of the coining of the wire after drawing provides additional cold working of the material local to the load, yielding an increase in the tensile strength (hardness) in that area.

Coined drawbar hook ends or spring anchors, such as those provided with coining 103, will sustain heavy loads before deforming due to a stronger rectangular cross section (versus a round cross section). This strength also comes as:

- The result of a better distribution of the same amount of material relative to neutral bending axis.
- The result of the coining of the wire after drawing provides additional cold working of the material local to the load, yielding an increase in the tensile strength (hardness) in that area.

The coined section of the U-shaped end of the drawbar may be more suitable for connection to mating parts, for example when the drawbar hooks into a groove, notch or some other similar shape.

Figure 13:
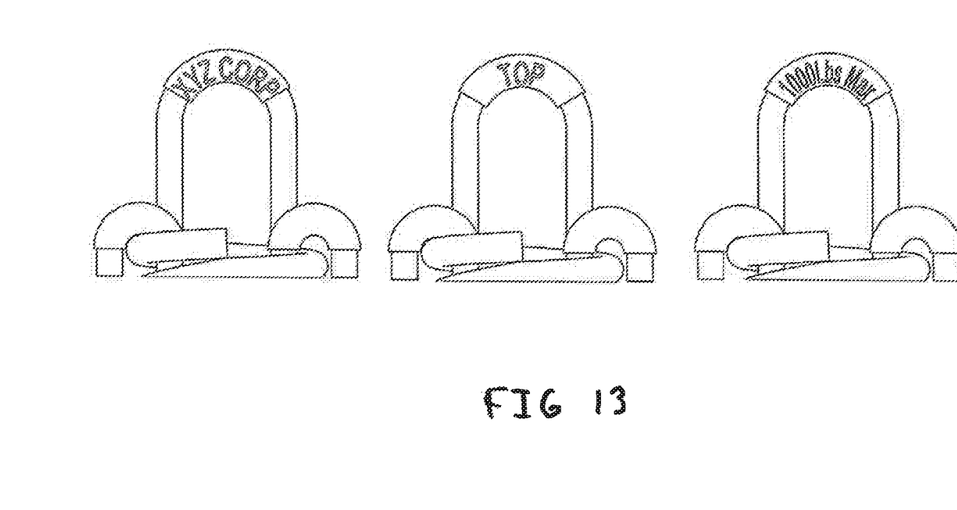
FIG. 13 shows examples of letter stamping in a coined section.

It is less likely for the coined drawbars to fail due to poor selection or misuse, as it is less likely for the user to select the incorrect source or "grade" of drawbar assembly or improperly orient the drawbar assembly during installation because:

- The flatter/wider surface of the drawbar can be stamped, with the manufacturer's name, brand or logo, or other indicia to maintain traceability of the assembly for reordering or investigative purposes. See, for example, the stampings shown in FIG. 13.

The flatter/wider surface of the coined section can be stamped to label the proper orientation of the assembly for installation (for example, "Top" or "Bottom", should that be required).

The flatter/wider surface of the coined section can be stamped with the grade and/or the maximum load rating of the drawbar assembly for proper identification.

The above stampings can occur during coining, or afterwards.

The coined drawbar is relatively cost efficient, as less material is required to reach higher strength (as opposed to using a larger gauge wire):

The amount of material of the rectangular cross-sectional area after coining is the same as the amount of material of the round cross-sectional area before coining, so the drawbar weight is maintained, and would be lighter than a comparable strength round, cross-section wire drawbar without the coining.

Because the drawbar is made from round section wire before coining, standard round material can be used. Rectangular cross-section material must be typically specially ordered, generally at a higher cost and with additional delay.

In accordance with another embodiment a drawbar assembly configured for swimming pool cover securement is described. Here, coining is provided to solve the problems discussed above with regard to the use of conventional drawbar assemblies, namely, to hold a fabric safety-cover over a swimming pool, e.g., during off-season.

Figures 14A, 14B:
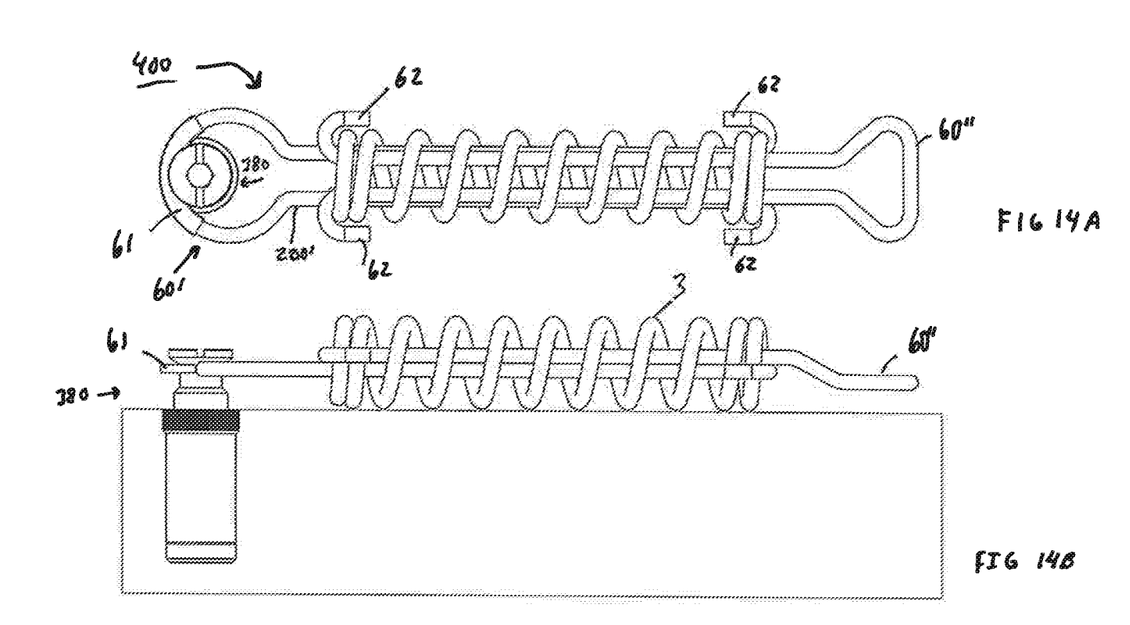
FIGS. 14A and 14B are views of a coined pool cover drawbar assembly installed over mounting anchor.

FIGS. 14A and 14B are views of a coined pool drawbar assembly 400 installed over a mounting anchor 380. Such anchors are typically positioned about a periphery of the pool, (see FIG. 6). As can be seen in the FIGS. 14 and 14B, the securement rounded end 60' engages the mounting anchor 380 and the part of the drawbar contacting the anchor is the coined portion.

Figure 15A:
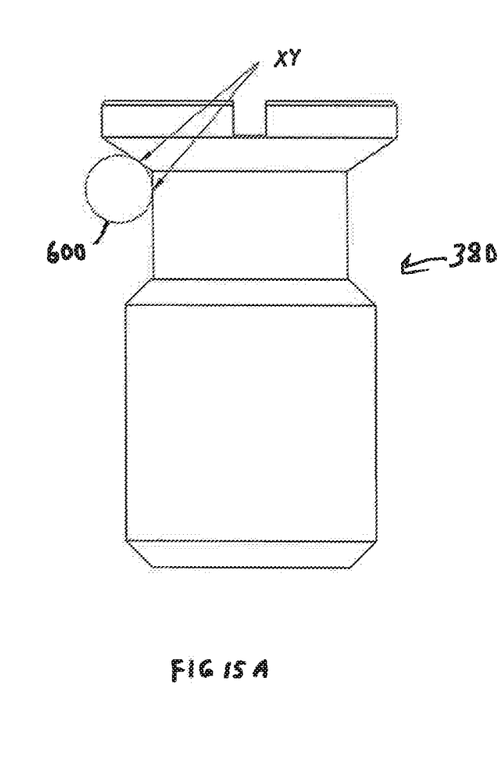
FIGS. 15A and 15B are views showing coined and uncoined wire cross sections mating with anchor.

As was discussed above, when using a conventional pool drawbar assembly, the mounting anchor creates a point load, in particular, as can be seen in FIG. 15A which shows two points of contact (shown as X and Y in FIG. 15A) with the anchor stud. This point load can cause the round-ended drawbar to bend (elongate) when overloaded, to an extent such that the installation tool will no longer fit.

Figure 15B:
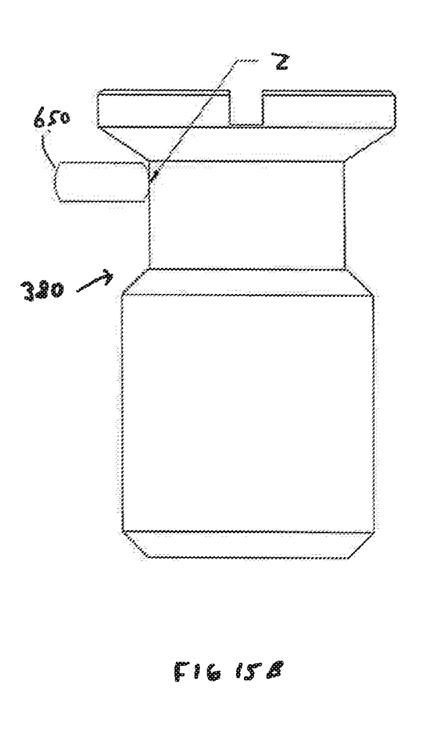

The coining in the pool drawbar 650, however, provides a single point of contact with the anchor stud (shown as Z) in FIG. 15B.

Additional benefits of the invention for this application include:

The coined pool drawbar is less likely to unintentionally disengage from the anchor stud because it is less likely to distort and lose strap tension.

The stronger rectangular cross section of the coined region (versus a round cross section of an uncoined region) provides improved distribution of the same amount of material.

The drawbar is less likely to "ride up" on the anchor or dislodge the anchor because:

The coined section is thinner (the rectangular thickness is less than the round thickness) and the drawbar will only contact a shank portion rather than a flange portion of anchor stud (see FIG. 15B).

The smaller edge radius after coining eliminates the upward radius contact point angle with the anchor flange when using round wire drawbars that could generate a vertical force to dislodge the anchor.

The coining of the portion of the round-ended drawbar in the area local to the applied load (at the anchor) significantly reduces the tendency to distort under heavy loads due to the strengthening of the drawbar.

While specific configurations of the coined drawbars and drawbar assemblies have been described, it is understood that the present invention can be applied to a wide variety of spring and related product applications. Thus, the scope of the invention should be interpreted with reference to the claims.

What is claimed is:

1. A drawbar assembly, comprising:
a first continuous drawbar having an open end, a closed end, and an elongate body extending therebetween along an axis, and a spring anchor formed at the open end;
a second continuous drawbar having an open end, a closed end, and an elongate body extending therebetween along the axis, and a spring anchor formed at the open end;
the first and second drawbars oriented with respect to each other such that at least a portion of each elongate body overlaps with the other along the axis such that the open end of one drawbar is proximate the closed end of the other; and
a compression coil spring positioned over the overlapping elongate body portions and secured at each end by a respective spring anchor;
wherein a region of at least one closed end is coined.

2. The drawbar assembly of claim 1, wherein both closed ends are coined.

3. The drawbar assembly of claim 1, wherein the diameter of each drawbar is constant except for the coined region.

4. The drawbar assemble of claim 1, wherein the spring anchors are configured as hooks and are coined.

5. The drawbar assembly of claim 1, wherein the closed end of the first drawbar is configured as a U-shape.

6. The drawbar assembly of claim 1, wherein the closed end of the first drawbar is configured as a circular loop and is dimensioned to engage an anchor stud.

7. The drawbar assembly of claim 6, wherein the closed end of the second drawbar is configured as a non-circular loop to accommodate attachment of a strap.

8. The drawbar assembly of claim 1, wherein the coined region interrupts the elongate axis.

9. The drawbar assembly of claim 1, wherein the drawbars and spring are comprised of metal.

* * * * *